US012605625B2

(12) United States Patent
Kanza et al.

(10) Patent No.: US 12,605,625 B2
(45) Date of Patent: Apr. 21, 2026

(54) METHOD AND APPARATUS FOR IMPROVING PERFORMANCE OF A GAMING APPLICATION

(71) Applicant: AT&T Intellectual Property I, L.P., Atlanta, GA (US)

(72) Inventors: Yaron Kanza, Fair Lawn, NJ (US); Raghvendra Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 449 days.

(21) Appl. No.: 17/971,772

(22) Filed: Oct. 24, 2022

(65) Prior Publication Data

US 2024/0131422 A1    Apr. 25, 2024
US 2024/0226727 A9    Jul. 11, 2024

(51) Int. Cl.
*A63F 13/35* (2014.01)
*H04L 47/2483* (2022.01)

(52) U.S. Cl.
CPC .......... *A63F 13/35* (2014.09); *H04L 47/2483* (2013.01); *A63F 2300/534* (2013.01)

(58) Field of Classification Search
CPC . A63F 13/35; A63F 2300/534; H04L 47/2483
See application file for complete search history.

(56) References Cited

U.S. PATENT DOCUMENTS

| | | | |
|---|---|---|---|
| 5,367,643 A * | 11/1994 | Chang ................... | H04L 49/901 |
| | | | 710/62 |
| 2004/0063497 A1 * | 4/2004 | Gould ................... | A63F 13/792 |
| | | | 463/42 |
| 2013/0322255 A1 * | 12/2013 | Dillon ................. | H04L 41/5025 |
| | | | 370/236 |
| 2014/0140213 A1 * | 5/2014 | Raleigh ............... | H04L 41/0894 |
| | | | 370/235 |
| 2016/0236083 A1 * | 8/2016 | Perlman ................ | H04L 65/403 |
| 2016/0344604 A1 * | 11/2016 | Raleigh ............... | H04L 43/0876 |
| 2019/0158371 A1 * | 5/2019 | Dillon ................... | H04L 47/196 |
| 2019/0306069 A1 * | 10/2019 | Bacik ................... | H04L 41/0895 |
| 2020/0112514 A1 * | 4/2020 | Fraser ................... | H04L 47/225 |
| 2021/0211384 A1 * | 7/2021 | Fraser .................... | H04L 47/27 |
| 2022/0116336 A1 * | 4/2022 | Cuevas Ramirez .... | H04L 41/40 |
| 2022/0184503 A1 * | 6/2022 | Brown ................... | A63F 13/358 |
| 2022/0239720 A1 * | 7/2022 | Madanapalli ....... | H04L 47/2483 |
| 2023/0123322 A1 * | 4/2023 | Cella .................... | G06Q 10/067 |
| | | | 700/29 |
| 2023/0412516 A1 * | 12/2023 | Wang ................... | H04L 47/283 |

* cited by examiner

*Primary Examiner* — Dmitry Suhol
*Assistant Examiner* — Ankit B Doshi
(74) *Attorney, Agent, or Firm* — Guntin & Gust, PLC; Miyoung Shin

(57) ABSTRACT

Aspects of the subject disclosure may include, for example, monitoring internet traffic, identifying a portion of the internet traffic associated with a plurality of gaming activities, and prioritizing at least a segment of the portion of internet traffic to reduce latency in processing at least a portion of the plurality of gaming activities. Other embodiments are disclosed.

20 Claims, 11 Drawing Sheets

100

200

220B

220D

PREDICT GAMING OBJECTS — 232

CACHE GAMING OBJECTS — 234

No

GAMING TRAFFIC — 236

Yes

PRIORITIZE TRAFFIC — 238

REQUEST GAMING OBJECT — 240

246

No

REQUEST OBJECT ◄ CACHE OBJECT — 242

Yes

248

SERVE UNCACHED OBJECT

SERVE CACHED OBJECT — 244

230

300

600

METHOD AND APPARATUS FOR IMPROVING PERFORMANCE OF A GAMING APPLICATION

FIELD OF THE DISCLOSURE

The subject disclosure relates to a method and apparatus for improving performance of a gaming application.

BACKGROUND

Video games are gaining a lot of popularity and they are increasingly becoming more and more connected via the Internet in a variety of forms. There are different types of online games, multi-player games, and mobile video games, in which the connection to the network is essential. Recently, there is also a growing interest in virtual reality (VR), with focus on VR-based applications which are linked via the Web and create virtual worlds. To support online gaming and connected virtual worlds, there is a need for a highly reliable network that is capable of high throughput, low latency, and high reliability, especially when handling 3D objects that constitute scenes in video games or VR applications.

BRIEF DESCRIPTION OF THE DRAWINGS

Reference will now be made to the accompanying drawings, which are not necessarily drawn to scale, and wherein.

DETAILED DESCRIPTION

Figure 1:
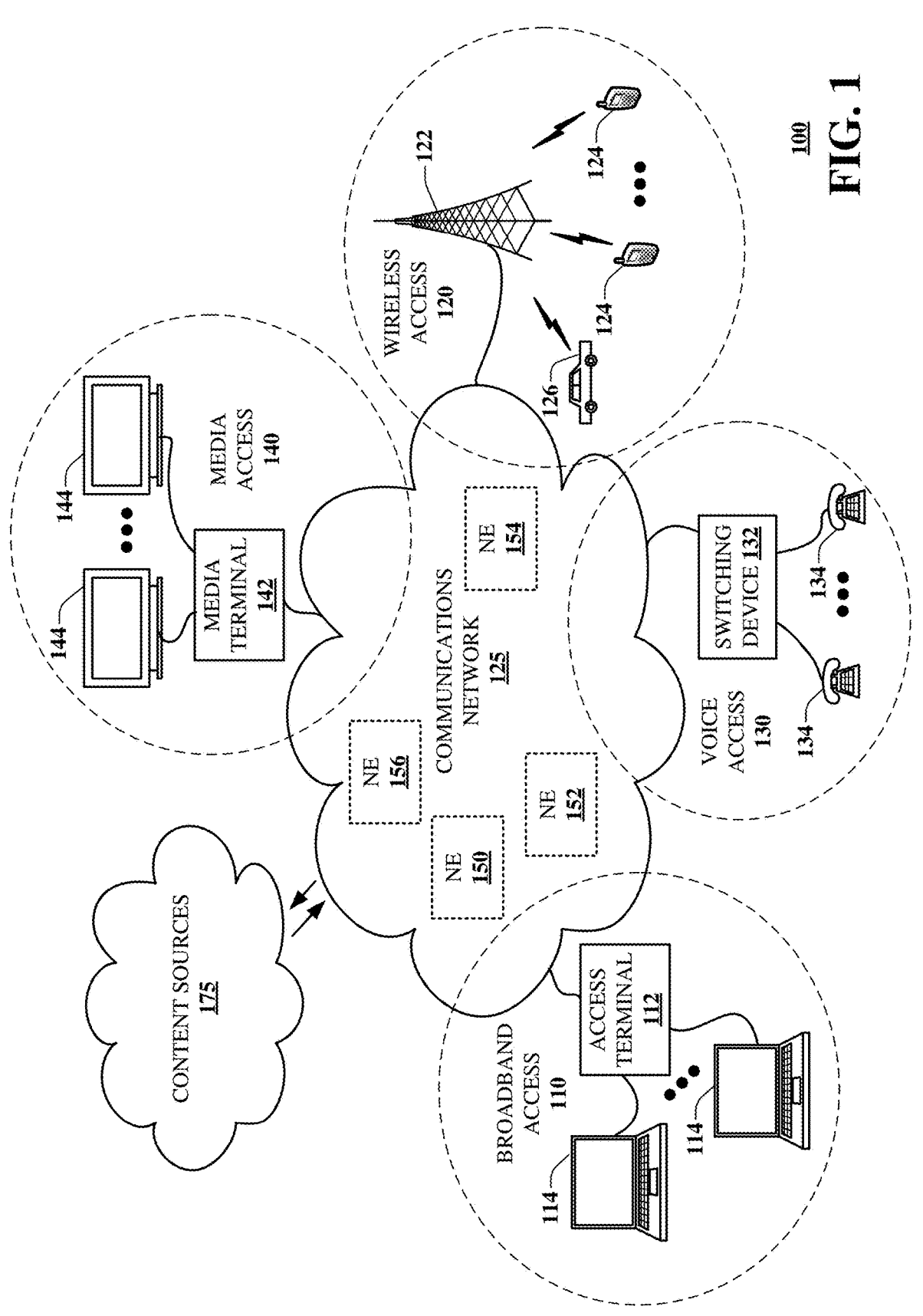
FIG. 1 is a block diagram illustrating an exemplary, non-limiting embodiment of a system in accordance with various aspects described herein.

The subject disclosure describes, among other things, illustrative embodiments for improving performance of a gaming application. Other embodiments are described in the subject disclosure.

One or more aspects of the subject disclosure include a gateway having a processing system including a processor, and a memory that stores executable instructions that, when executed by the processing system, facilitate performance of operations. The operations can include providing one or more computing devices access to internet services, monitoring internet traffic associated with the one or more computing devices, identifying a first portion of the internet traffic associated with a plurality of gaming activities, identifying a second portion of the internet traffic associated with non-gaming activities, and prioritizing at least a segment of the first portion of internet traffic to reduce latency in processing at least a portion of the plurality of gaming activities.

One or more aspects of the subject disclosure include a non-transitory machine-readable medium, having executable instructions that, when executed by a gateway including a processor, facilitate performance of operations. The operations can include providing one or more computing devices access to internet services, monitoring internet traffic associated with the one or more computing devices, storing in the non-transitory machine-readable medium a plurality of gaming objects associated with a gaming application, identifying a first portion of the internet traffic associated with a plurality of gaming activities, identifying at least one first gaming object from the plurality of the gaming objects that is associated with at least a segment of the first portion of the internet traffic, retrieving the at least one first gaming object from the non-transitory machine-readable medium without submitting a request to the gaming application for the at least one first gaming object, and supplying the at least one first gaming object to a first computing device of the one or more computing devices to reduce latency in a use of the at least one first gaming object by the first computing device.

One or more aspects of the subject disclosure include a method for providing, by a first gateway including a processor, one or more first computing devices access to internet services; monitoring, by the first gateway, internet traffic associated with the one or more first computing devices; identifying, by the first gateway, a first portion of the internet traffic associated with a first gaming activity of a gaming application, the gaming activity associated with a first computing device of the one or more first computing devices; receiving, by the first gateway, an indication that a second gateway has detected a second gaming activity of the gaming application, the second gaming activity associated with a second computing device that the second gateway supplies internet services to; and initiating, by the first gateway, a synchronization process with the second gateway to synchronize gaming activities between the first computing device and the second computing device.

Referring now to FIG. 1, a block diagram is shown illustrating an example, non-limiting embodiment of a system 100 in accordance with various aspects described herein. For example, system 100 can facilitate in whole or in part improving performance of gaming applications by adapting gateways (see FIG. 2A) operating in system 100 to perform any number of techniques such as traffic management, caching, synchronization and asset management as will be described below for FIGS. 2A-2F. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
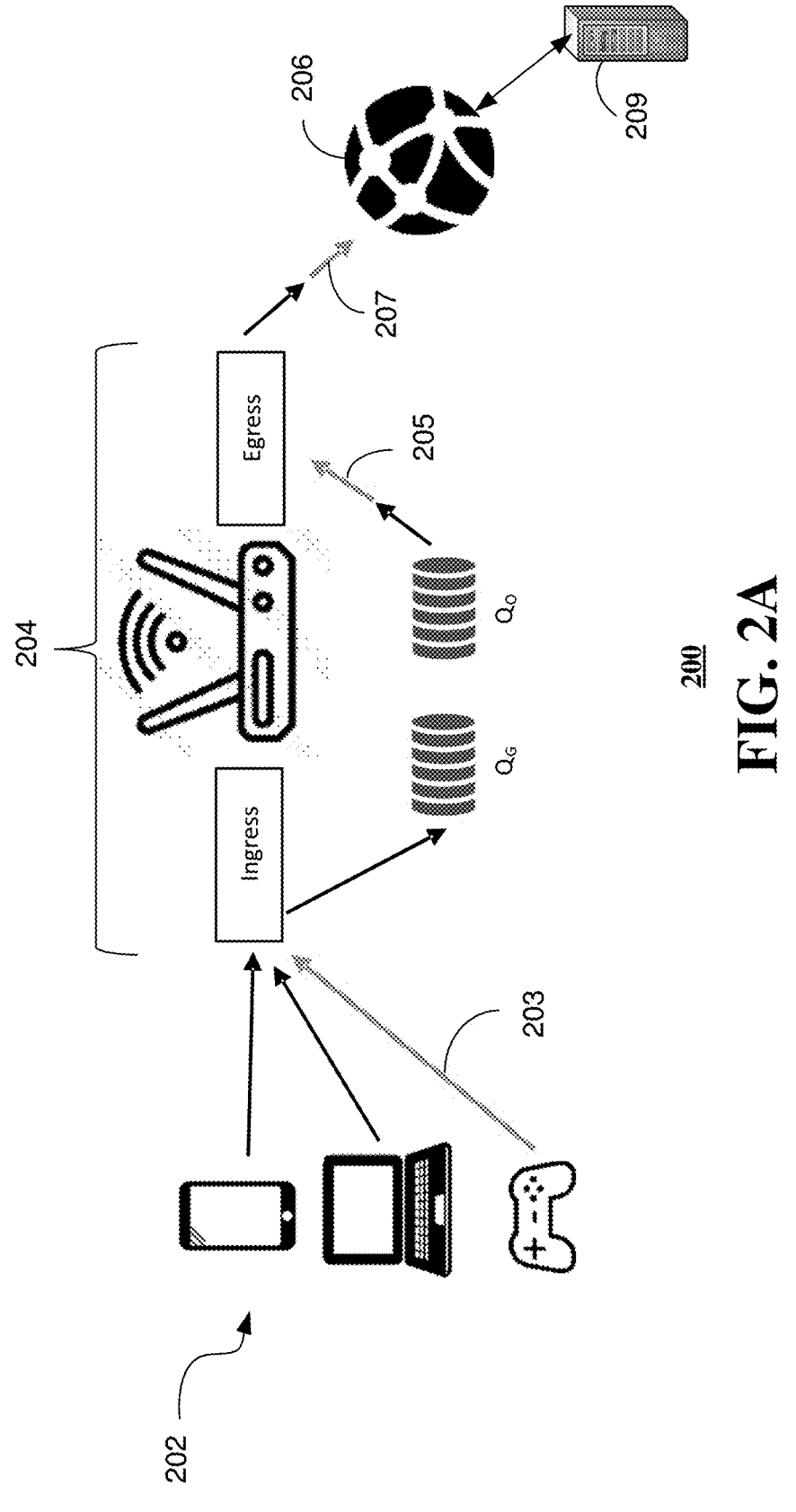
FIG. 2A is a block diagram illustrating an example, non-limiting embodiment of a sub-system functioning within the system of FIG. 1 in accordance with various aspects described herein.

FIG. 2A is a block diagram illustrating an example, non-limiting embodiment of a sub-system 200 functioning within the communication network of FIG. 1 in accordance with various aspects described herein. The sub-system 200 can include computing devices 202 communicatively coupled to a gateway 204. The gateway 204 can provide internet services to the computing devices 202 by way of an internet service provider (ISP) 206, thereby enabling one or more of the computing devices 202 to initiate online gaming activities via a gaming server 209 coupled to the ISP 206.

The computing devices 202 can include, for example, a smartphone, a computer, a gaming console, or other instantiations of a computing device. In one embodiment, the gateway 204 can be operate from a residence, commercial establishment, at a service area interface (SAI) serving residences and/or commercial establishments, or at a central office serving a cluster of residences and/or commercial establishments. The gateway 204 can be configured to perform one or more methods to improve performance of gaming applications. Such methods can include traffic management, caching, synchronization, asset management, or combinations thereof as will be described further in FIGS. 2B-2F.

Traffic management can include setting priorities for gaming-related network traffic. Caching can include pre-emptive content caching and effective content delivery. Synchronization can include synchronizing gaming activities between computing devices 202 communicatively coupled to different gateways 204 situated at geographically diverse locations in system 100. Asset management can include enabling access to gaming objects with an e-wallet using, for example, blockchain technology and cryptocurrency. The gateway 204 can be configured to perform traffic management, caching, synchronization, asset management, or combinations thereof to provide a better user experience for gamers by integrating such enhancements near a location of video gamers (e.g., at a residence, at a commercial establishment, at an edge gateway, or last mile placement of a gateway). It will be appreciated that any aspect of the techniques utilized by the gateway 204 and/or the gateway 204 itself can in whole or in part be virtualized as will be described in FIG. 3.

Many online video games, multiplayer video games and online virtual-reality applications require the combination of a fast and reliable network with strong computation and rendering capabilities. The need to support high-resolution images, interactivity and fast response time make these applications demanding for the services provided by system 100. The user experience could be highly affected by the network capabilities of system 100, so adapting the gateway 204 in system 100 to improve gaming performance of online gaming and VR applications can enhance the overall experience for gamers.

Typically, online games and online VR applications require a much faster response time (lower latency) than other applications. In an online shooting game, the delay between a time when a gamer is performing a shooting action and a time when the action reaches a gaming server 209 should be as small as possible. In contrast, latency has a much lower significance in streaming video or interactions in an online social network. To enhance gaming performance, the gateway 204 can be configured to give preference to network traffic associated with applications that require a low latency over traffic of applications in which latency is not critical.

To implement traffic priorities, the gateway 204 can be configured to identify network packets and flows that are part of a video game or virtual-reality application, and apply prioritization over the network traffic. In one embodiment, identifying network packets that belong to a gaming application can be done manually, by letting users identify certain applications as gaming applications and sending that information to the gateway 204 via a suitable interface (e.g., configuring the gateway 204 via a browser interface). In another embodiment, identifying network packets can be performed automatically by the gateway 204 by monitoring packet traffic and identifying one or more properties of the traffic that distinguish gaming packets versus non-gaming packets.

In one embodiment, the gateway 204 can be configured to store a table of devices that should receive priority, such as gaming consoles or other devices that are used mostly for gaming. The gateway 204 can be configured to identify these devices and packets associated therewith based on a Media Access Control (MAC) address or IP address assigned to these devices by the gateway 204 (as reflected in the Network Address Translation or NAT). In another embodiment, the gateway 204 can be configured to monitor network traffic and identify gaming packets based on inclusion of a destination IP address of the gaming server 209. By detecting that the destination IP address is of the gaming server 209, traffic related to gaming can be discovered. In another embodiment, the gateway 204 can be configured to identify gaming-related traffic based on network-traffic features. In one embodiment, features related to network traffic can be measured, and the measurements can be used to train a Machine Learning (and/or Artificial Intelligence or AI) model for detecting network traffic associated with gaming activities. For instance, a neural network like CNN (Convolution Neural Network), LSTM (Long Short-Term Memory Network), Transformer, or combinations thereof can be utilized by the gateway 204 and trained for detecting gaming-related network traffic. In one embodiment, the following features can be used to train ML/AI models: flow size, the size of packets in the flow, source/destination IP and port, traffic rate, or combinations thereof.

To implement the prioritization for outgoing traffic, the gateway 204 can be configured to maintain two memory queues, such as those labeled $Q_G$ and $Q_O$ (see FIG. 2A) for managing IP packets. It will be appreciated that the ingress and egress queues shown in FIG. 2A are shown for illustration purposes and operate within hardware of the gateway 204. In one embodiment, packets identified at the ingress queue as related to gaming can be inserted into the queue $Q_G$. Other packets arriving at the ingress queue that are unrelated to gaming can be inserted into $Q_O$. In one embodiment, the gateway 204 can be configured to forward to the Egress queue the packets from $Q_G$ and then the packets from $Q_O$. This gives priority to packets associated with gaming. In another embodiment, priority can be implemented by the gateway 204 as a rate ratio r where for every r packets transferred from $Q_G$ to the Egress queue one packet from $Q_O$ is transferred to the Egress queue.

In another embodiment, there can be several queues with different r ratios of transferring packets to the Egress queue, resulting in different priority policies. Such an embodiment can be used when there is a distinction between games where in some games latency is critical and other games where latency is important but less critical. This embodiment can be implemented by separating $Q_G$ into multiple queues and defining a suitable rate for moving packets to the Egress queue from each subset of the $Q_G$ queues.

It will be appreciated that traffic prioritization as described above for traffic that flows from computing device 202 to gateway 204 can be implemented in a reverse direction. That is, the gateway 204 can be configured to perform traffic prioritization in a similar manner for network traffic coming from the ISP 206 and directed to one or more of the computing devices 202. For example, a portion of network traffic from the ISP 206 can be identified by the gateway 204 as gaming packets, which can be directed to the computing devices 202 before non-gaming related packets detected by the gateway 204 from another portion of the network traffic. In another embodiment, the rate r can be dynamic, and change based on different parameters such as time, day, type or number of devices connected to the gateway 204, user preferences, or any combinations thereof.

In yet another embodiment, the gateway 204 can be configured to perform traffic prioritization based on types of actions within a gaming application. For example, in a shooting game, actions like shooting or raising a shield could receive a higher preference over actions like getting textual information about a character or a tool. To implement this, IP packets that should receive high priority can be marked by the gateway 204 and processed in a priority queue $Q_G$. Marking the relevant flows can be performed by the gateway 204 in different ways such as, for example, using a dedicated source IP address or port that indicates which flows should have high priority. Other fields of IP packets can also be used for marking by the gateway 204 such as, for example, Virtual LAN (VLAN) tagging. The priority could also be set by one or more packets that indicate priority of the flow to the gateway 204, which can cause other packets to be dropped by the gateway 204 if traffic conditions are high before moving the packets to the Egress queue.

FIGS. 2B, 2C, 2D and 2E are flowcharts 220A-220D illustrating example, non-limiting embodiments of caching operations in the sub-system 200 of FIG. 2A in accordance with various aspects described herein. The gateway 204 can be configured to cache gaming objects (e.g., a gaming scenery such as a building, a gaming object such as a gun, a software update, an item represented by an Non-Fungible Token or NFT, etc.). The cache provides local storage for gaming objects (files) that were supplied by the gaming server 209. Note that an NFT is stored in a blockchain, but the item it represents is a digital file that can be cached by the gateway 204. For example, a picture or a unique figure of a game could be associated with an NFT. The NFT will be stored on the blockchain but the file this NFT represents can be stored in the cache of the gateway 204. When an object is requested by a computing device 202, the gateway 204 can check if it is in the cache. If detected, the gaming object can be supplied by the gateway 204 directly to the computing device 202 from the cache instead of retrieving it from the gaming server 209. This can substantially reduce the latency of gaming actions because retrieving gaming objects from the local cache of the gateway 204 is much faster than retrieving gaming objects from a remote location such as the gaming server 209.

In one embodiment, the gateway 204 can be configured to maintain a cache that is adapted to storage of virtual worlds (or other gaming objects) to support preemptive retrieval of a scenery of a 3D virtual world according to a gaming avatar position and/or direction as controlled by a gamer utilizing a computing device 202 (e.g., gaming console). In a virtual world, the avatar travels and operates is a virtual space and the scenery is retrieved based on the location and orientation of the avatar (or movements caused by the gamer). For example, consider a virtual city in a virtual world or an online game. The avatar virtually travels in that world and parts of the virtual world need to be retrieved and presented to the gamer (via the computing device 202) as the avatar progresses. Thus, the location and direction of the avatar in the virtual world can direct what items are retrieved from the cache. When visual resolution of a game is high (e.g., 4K), a lot of data is transferred through the network elements of system 100 of FIG. 1. Without a caching feature provided by the gateway 204, loading time of a virtual scenery based on a download of this scenery from the gaming server 209 to the computing device 202 could be sufficiently high to negatively impact the game and cause dissatisfaction to the gamer. Having the data at the local cache of the gateway 204 can mitigate or eliminate this impact altogether.

In one embodiment the cache of the gateway 204 can be configured to store sub-spaces of the virtual world. The virtual world can, for example, consist of a static background and/or dynamic moving objects like avatars, creatures, weapons, tools, etc. In one embodiment, the cache can be configured to mostly include static background parts so that the retrieval of a new scenery will be fast when the gamer causes movement within the virtual world. The geospatial information that represents the static background can be a 3D model and can be a polygon mesh, raster image, polygonal 3D shapes, or any other representation of objects and textures in a 3D space. The gaming objects can be represented with coordinates, to specify their location and shape in the 3D virtual world. Typically, the coordinate system uses Cartesian linear coordinates (X-Y-Z), but there can be other forms of coordinates such as an angular (polar) coordinate system. Transformation between coordinate systems can be used so that techniques that are relevant for one coordinate system can also be applied to other coordinate systems. It will be appreciated that the foregoing techniques can be adapted for dynamic moving objects.

Figure 2B:
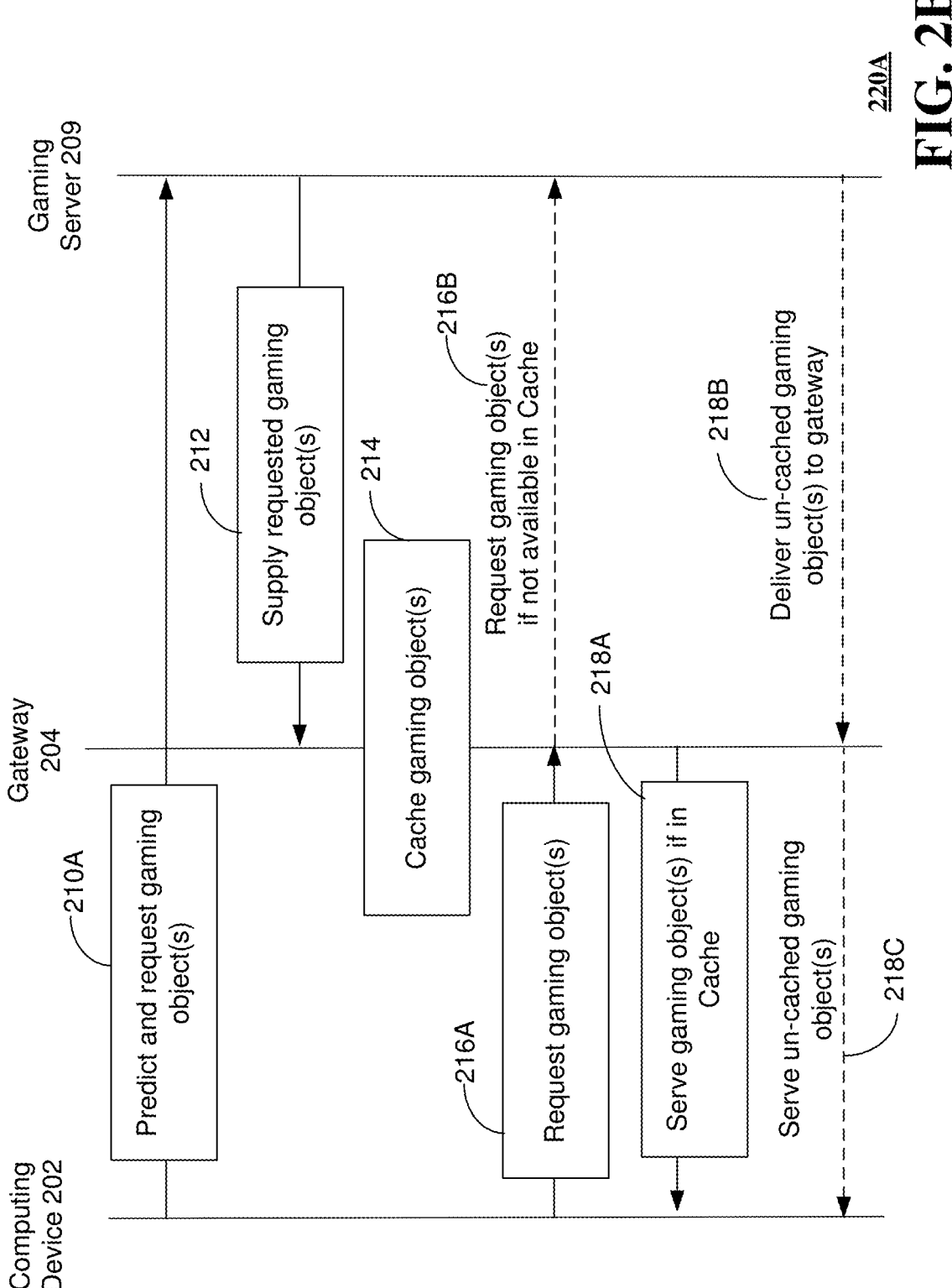
FIGS. 2B, 2C, 2D and 2E are flowcharts illustrating example, non-limiting embodiments of caching operations in the sub-system of FIG. 2A in accordance with various aspects described herein.

The collecting of gaming objects by the cache can be based on a pull request from a local gaming application executed by a computing device 202, or a push action, where gaming objects are pushed to the cache by the gaming server 209. FIG. 2B depicts a flowchart 220A for a pull request. The flowchart 220A can begin at step 210A where a local gaming application executed by a computing device 202 computes or predicts a part of the virtual world (or other gaming object) that might be used by the local gaming application based on a location of an avatar in the virtual world or a direction in which the gamer directs movements of the avatar within the game. Prediction of a need for the gaming object by the local gaming application can be performed using interpolation or by applying a time-series forecasting method. The requested gaming object can constitute a specific area/space in the game that can be sent at step 210A to the gaming server 209 as a bounding box or sphere (center point and radius). At step 212 the gaming server 209 can send to the gateway 204 the geospatial information of the requested space, corresponding to all the objects that intersect the specified area identified in the request. The gateway 204 can store at step 214 the gaming object(s) associated with the requested space in a local cache. In one embodiment, the gateway 204 can create a spatial index for organizing and accessing the cached gaming object(s). The spatial index can be based on a k-d tree, R-tree, octree, quadtree, GiST, SP-GiST, etc.

When the local gaming application executed by the computing device 202 requests at step 216A a gaming object such as scene information for a sub-space of the virtual world, the gateway 204 can detect the request by monitoring packets transmitted by the computing device 202. The gateway 204 can then determine if the requested object (or relevant sub-space) is in the cache using the spatial index. If the gaming object is found, the gateway 204 retrieve it from the cache and serve it to the computing device 202 at step 218A. If the gateway 204 does not find the requested gaming object in the cache, the gateway 204 can forward the gaming packets associated with the request to gaming server 209 at step 216B. The gaming server 209 can in return serve to the gateway 204 at step 218B the requested gaming object(s), which the gateway 204 can then serve to the computing device 202 at step 218C. At step 218B, the gateway 204 can also be configured to cache the gaming object(s) if, for example, the gaming object(s) have been determined by the gateway 204 to warrant caching. For example, the gateway 204 can be configured to cache the gaming object(s) if the gateway 204 detects a frequent recurrence of use of the gaming object(s) by the local gaming application operating from the computing device 202.

Figure 2C:
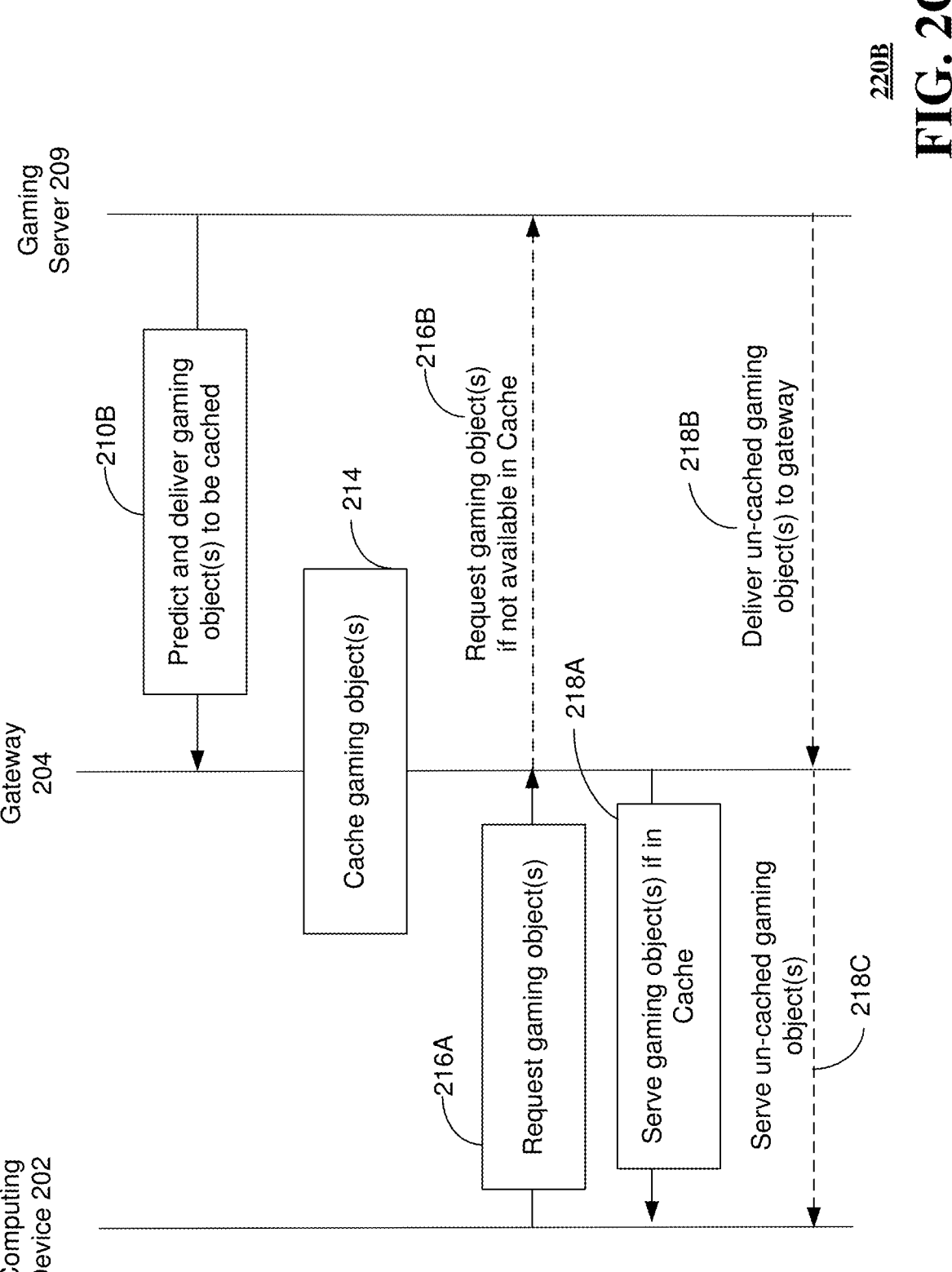

The flowchart 220B of FIG. 2C depicts a push scenario for caching gaming objects at the gateway 204. At step 210B, the gaming server 209 can predict and deliver gaming objects to cache at the gateway 204 at step 214. In one embodiment, the gaming server 209 can predict a future use of these gaming objects by a local gaming application based on a location and movement or direction of an avatar controlled by the gamer via a computing device 202. In another embodiment, the gaming server 209 can make this prediction by training a prediction model based on information gathered from a collection of gamers engage in the same or similar game. The prediction allows the gaming server 209 to preemptively push to the cache of the gateway 204 gaming objects such as area/space in the virtual world that the avatar controlled by the gamer is likely to visit. The prediction can also involve dynamic gaming objects likely to be used by the avatar such as weapons, or other objects. As described earlier, the gaming objects are indexed by the gateway 204. When the local gaming application requests a gaming object, the gateway 204 can intercept the request by monitoring packets sent therefrom, and either retrieve the object from the cache or forward the request to the gaming server 209 as previously described in steps 216A, 216B, and 218A-218C.

Note that in the pull and push flowcharts 220A, 220B of FIGS. 2A-2B gaming object retrieval from the local cache of the gateway 204 can be conducted differently from how it may be done by an ordinary Web cache. In embodiments of the subject disclosure, the storage and retrieval of objects from the cache of the gateway 204 are based on management and intersection of geospatial objects rather than using file names or a URL as is the case with a Web cache. In a web cache retrieval is based on URLs and file names. In contrast, the cache of the gateway 204 is based on spatial properties like inclusion in a space, inclusion in an area, proximity to a spatial object or to a given point, intersection with an area or space, etc.

There can be situations where a large object (or file) needs to be downloaded for use by a local gaming application. Such downloads may take time and in some instances require the gaming application to cease providing gaming services until the large object (or file) is downloaded. The large object can be a scene in a virtual-reality world, a new stage in a video game, a major software update, large files that include information about other players in a game, or any large file that is needed for the operations of the gaming application. In some embodiments, the file can be sent to the gateway 204 in a preemptive manner to be cached and retrieved from the cache when requested by a local gaming application executed by a computing device 202. The gateway 204 can be configured to intercept requests for the file by monitoring packets generated by a computing device 202 and serve the file from its cache to a requesting gaming application operating from the computing device 202. In one embodiment, the gateway 204 can be configured to manage the cache in a manner similar to a Proxy Cache that intercepts HTTP requests and serves them to a requesting device from the local cache.

One issue that can arise with preemptive content delivery is that often the authors or distributors of content may not wish for the content to be revealed or released too early. For example, it may be desirable to restrict a gamer's access to information regarding the next level in a game before the gamer passes the current level. As another example, consider a software update where a distributor or author of the software update wishes to send the content to its customers early to avoid causing network issues at the date of the software release and/or provide themselves time to make further updates before the release, while preventing access to the software update prior to the actual release date.

Figure 2D:
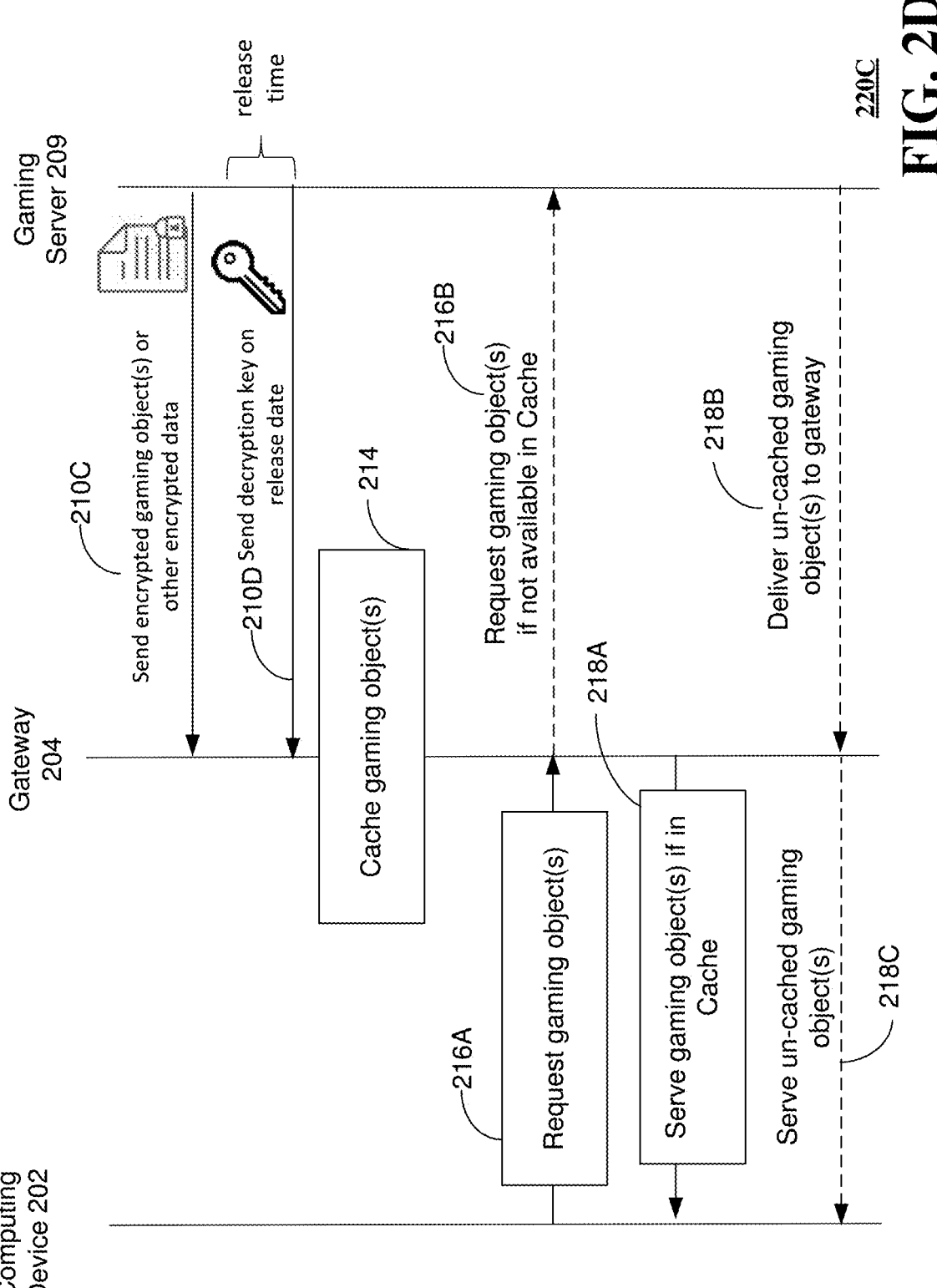
Figure 2E:
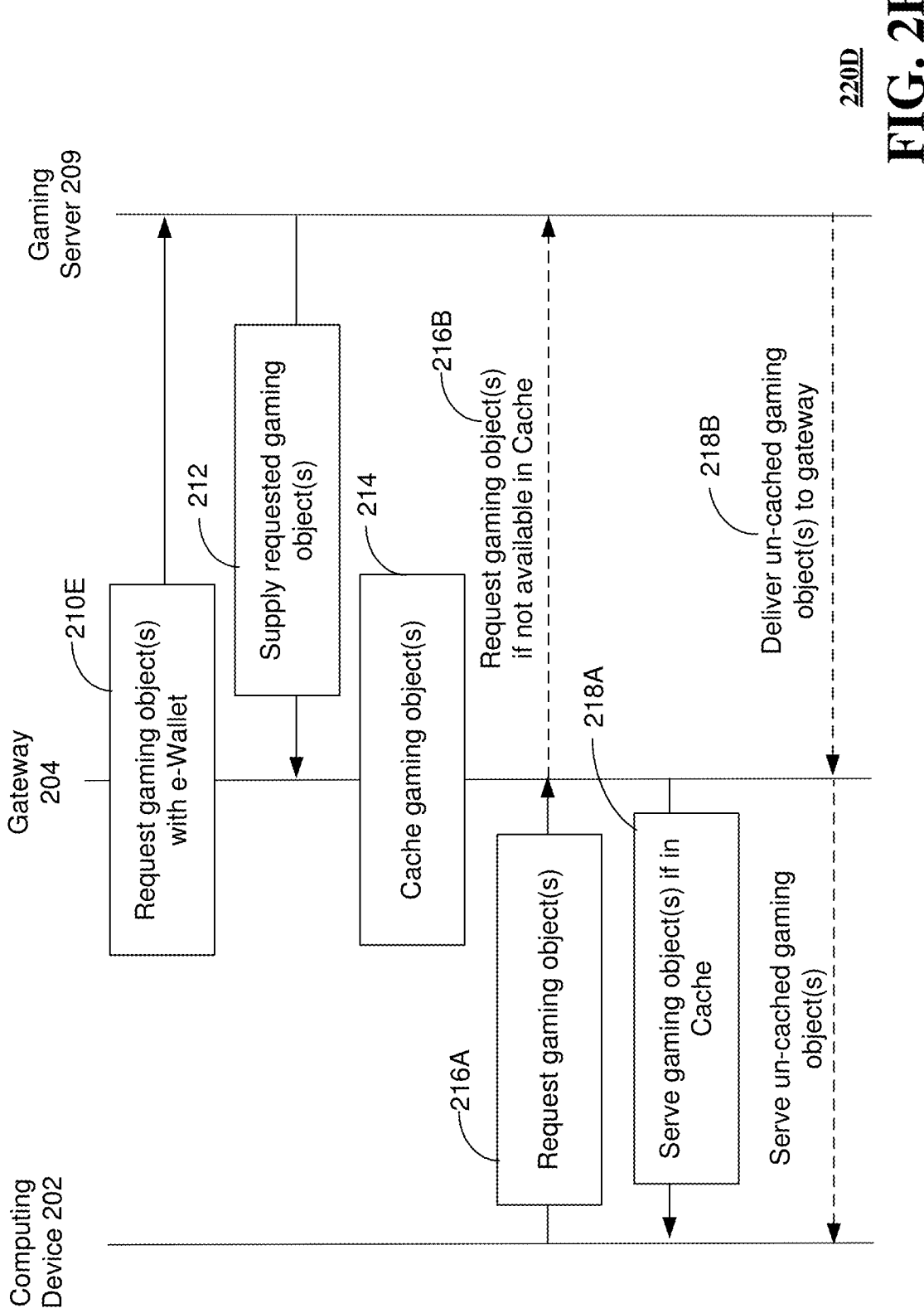

FIG. 2D depicts a flowchart 220C to accommodate a delayed delivery of content to a local gaming application and/or gamer. At step 210C the content can be sent encrypted from the gaming server 209 to the gateway 204, which stores it in the cache at step 214. The content can be encrypted according to Data Encryption Standard (DES), Advanced Encryption Standard (AES) or any other cryptographic encryption. At a time of release of the content, the decryption key can be sent at step 210D from the gaming server 209 to the gateway 204 to enable the gateway 204 to decrypt the content. Note that sending a decryption key requires a very short transmission with very little data, so it is fast and does not take much bandwidth in the network of system 100.

When a computing device 202 requests at step 216A a cached content, if the content is decrypted then it is served at step 218A by the gateway 204 from the cache in a way that spares the need to retrieve it from the gaming server 209. If the content is not cached, then the content is delivered in accordance with steps 216B and 218B-218C as previously described. In one embodiment, the gaming server 209 can be configured to send content as encrypted chunks, where different chunks are encrypted each with a different key. In this embodiment, the decryption keys can be sent to the cache at different times such as, for example, when a gamer progresses in the game to a next level or as an avatar travels in the virtual world and unlocks new virtual rooms. It will be appreciated that the embodiments of FIG. 2D can be applied to any form of gaming objects not just large files. For example, a small sized gaming object such as an encrypted weapon (or outfit of an avatar) can be supplied by a gaming server 209 and cached early as encrypted content by the gateway 204. The weapon (or clothing) is not decrypted until a release date at which the gaming server 209 supplies the decryption key.

It is common for gamers to use cryptocurrency to purchase virtual real estate in a virtual environment. Gamers can purchase, for example, Non-Fungible Tokens (NFTs), avatars, virtual costumes, etc. Purchased gaming assets can be managed on a blockchain while accessible using a wallet software. The wallet manages keys that identify and grant the gamer access to the purchased gaming assets. As these gaming assets become an integral part of the virtual environment of online games, it is beneficial to have the wallet managed by the gateway 204 (as depicted in the flowchart 220D of FIG. 2E) instead of having the wallet installed on each computing device 202.

In one embodiment, the wallet can be accessed via a web browser of a computing device 202. To increase security it would be beneficial for the computing device 202 to operate behind a Network Access Translation (NAT) and firewall operating from the gateway 204. Responsive to a gamer's access request, the wallet on the gateway 204 can be managed by the gateway 204 and used for paying or identifying the gamer, and for signing transactions at step 210E with the private key(s) stored in the wallet to cause the gaming server 209 to supply to the gateway 204 the gaming object(s)/asset(s) associated with the wallet. The gateway 204 can cache such gaming object(s)/asset(s) and/or supply such gaming object(s)/asset(s) to the computing device 202 at step 216A as previously described. The flowchart 220D of FIG. 2E makes management of wallets easier and more secure because the wallet can be managed in a single gateway 204 rather than on several computing devices 202, which can pose a security risk in exposing the gaming object(s)/as set(s).

In numerous games, time synchronization between gamers can be critical. For example, in a car race between two remote gamers utilizing different computing devices 202 coupled to different gateways 204 located at remote locations, it is highly desirable for the gamers to start the race at exactly (or at nearly) the same time. To accomplish this, the gateway 204 described of FIGS. 2A-2F can be configured to utilize a synchronization time stamping technique such as described in the IEEE Precision Timing Protocol (PTP) 1588 standard. Synchronizations could be achieved across geographically dispersed gateways 204 using IEEE PTP 1588 in order to time stamp gaming activities and thereby resolve conflicts in cases where it is essential to decide which remote player acted first.

Figure 2F:
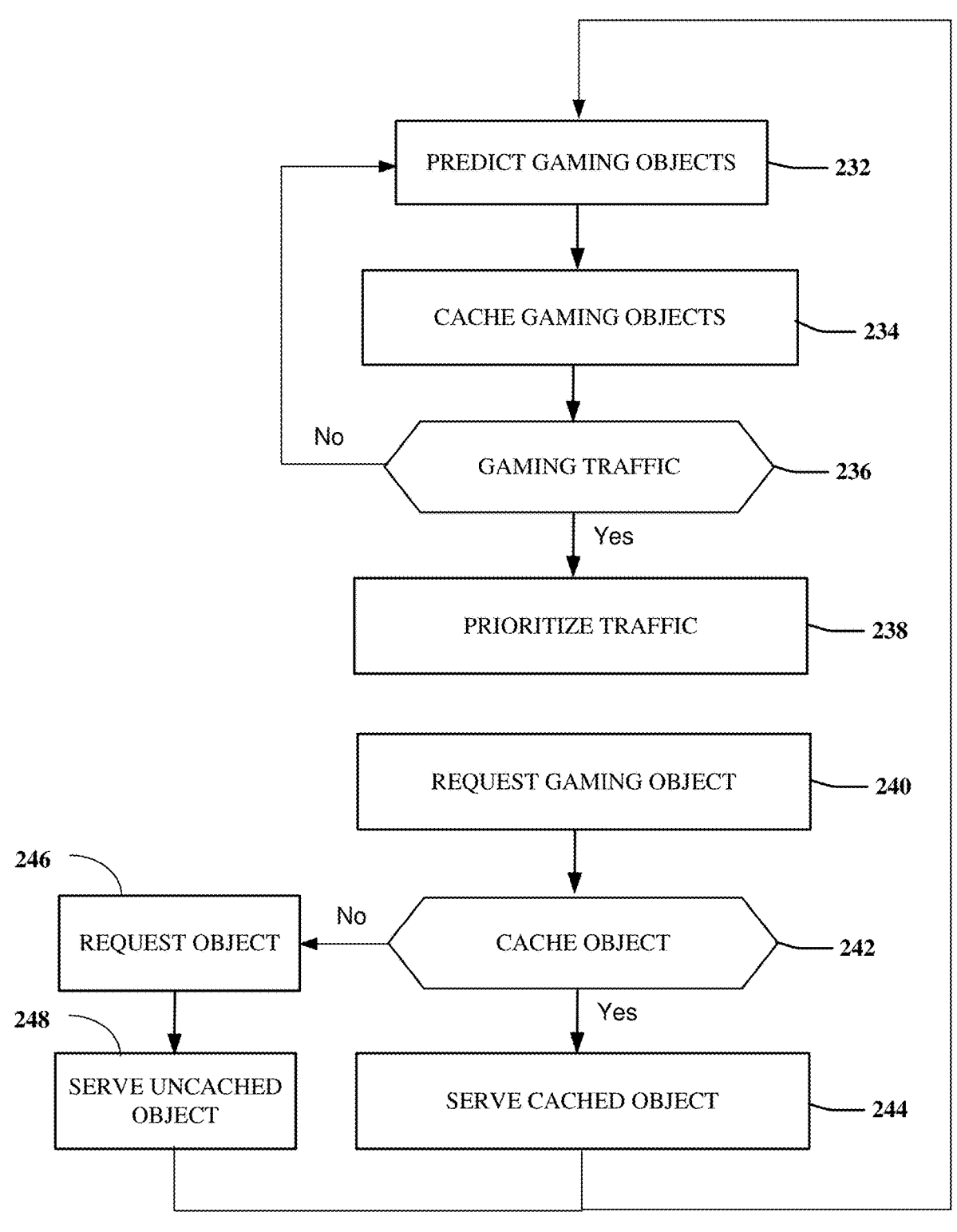
FIG. 2F depicts an illustrative embodiment of a method in accordance with various aspects described herein.

FIG. 2F depicts an illustrative embodiment of a method 230 in accordance with various aspects described herein. In one embodiment, method 230 can begin with step 232 where one or more gaming objects are predicted for use by a gaming application. The prediction can be performed by a local gaming application executed by one or more computing devices 202 and/or by a gaming server 209. At step 234, the gaming objects can be cached by the gateway 204. At step 236, the gateway 204 can be configured to monitor network traffic to identify gaming packets from non-gaming packets. When non-gaming packets are detected, the gateway 204 can repeat steps 232-234. When gaming packets are detected, such packets can be prioritized at step 238 to be sent before non-gaming packets. In one embodiment, a subset of the gaming packets can be prioritized based on a time-sensitive gaming activity detected by the gateway 204 (gun shot, sword movement, steering of a race car, etc.). In this embodiment, the non-gaming packets and the remainder of the gaming packets that were not identified as time-sensitive can be transmitted by the gateway 204 after the subset of gaming packets considered to be time-sensitive. In other embodiments, ratios can be used for prioritizing transmission of gaming packets versus non-gaming packets.

In another embodiment, method 230 can begin at step 240 where the gateway 204 can be configured at step 240 to detect from the gaming packets a request for a gaming object and determine if at step 242 such object is cached. If at step 242 the gateway 204 determines the request object is cached, the cached object can be served to the computing device 202 at step 244. In one embodiment, the gateway 204 can be configured to send the gaming packet to the gaming server 209 even if the gaming object has been served from the cache in order to keep the gaming server 209 informed of what the local gaming application is requesting. In another embodiment, the gateway 204 can be configured to prevent the gaming packet from being sent to the gaming server 209 if the gaming object has been served from the cache.

If at step 242 the gateway 204 determines the request object is not cached, the gateway 204 can be configured to send the gaming packet to the gaming server 209 to retrieve the requested gaming object. At step 248, the uncached gaming object can be supplied by the gaming server 209 to the gateway 204, which it then serves to the local gaming application executed by the computing device 202. In one embodiment, the gateway 204 can be configured to store the requested gaming object in its cache for future use by the local gaming application.

It will be appreciated that method 230 can be adapted so that steps 232-238 can be performed contemporaneously with steps 240-248. It will be further appreciated that method 230 can be adapted to perform other embodiments. For example, in one embodiment the gateway 204 can be configured to monitor gaming packets and predict use of a gaming object by predicting a frequency of use of the gaming object during a game and/or from an analysis of previous games. In this embodiment, the gateway 204 can be configured to submit a request to the gaming server 209 for the predicted gaming object without the local gaming application or the gaming server 209 making this prediction.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
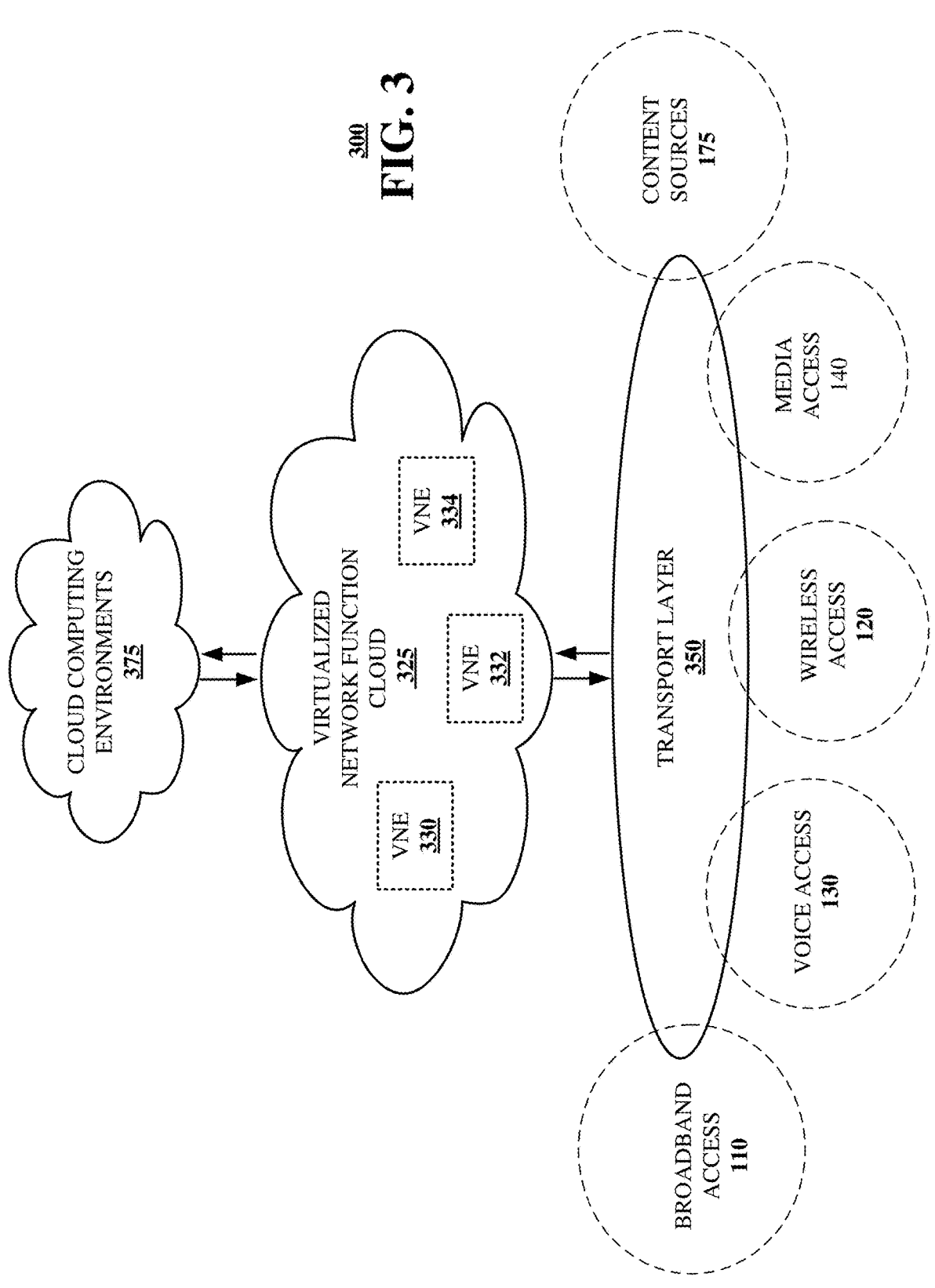
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part a virtualization of the gateway 204 and/or the gaming server 209.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
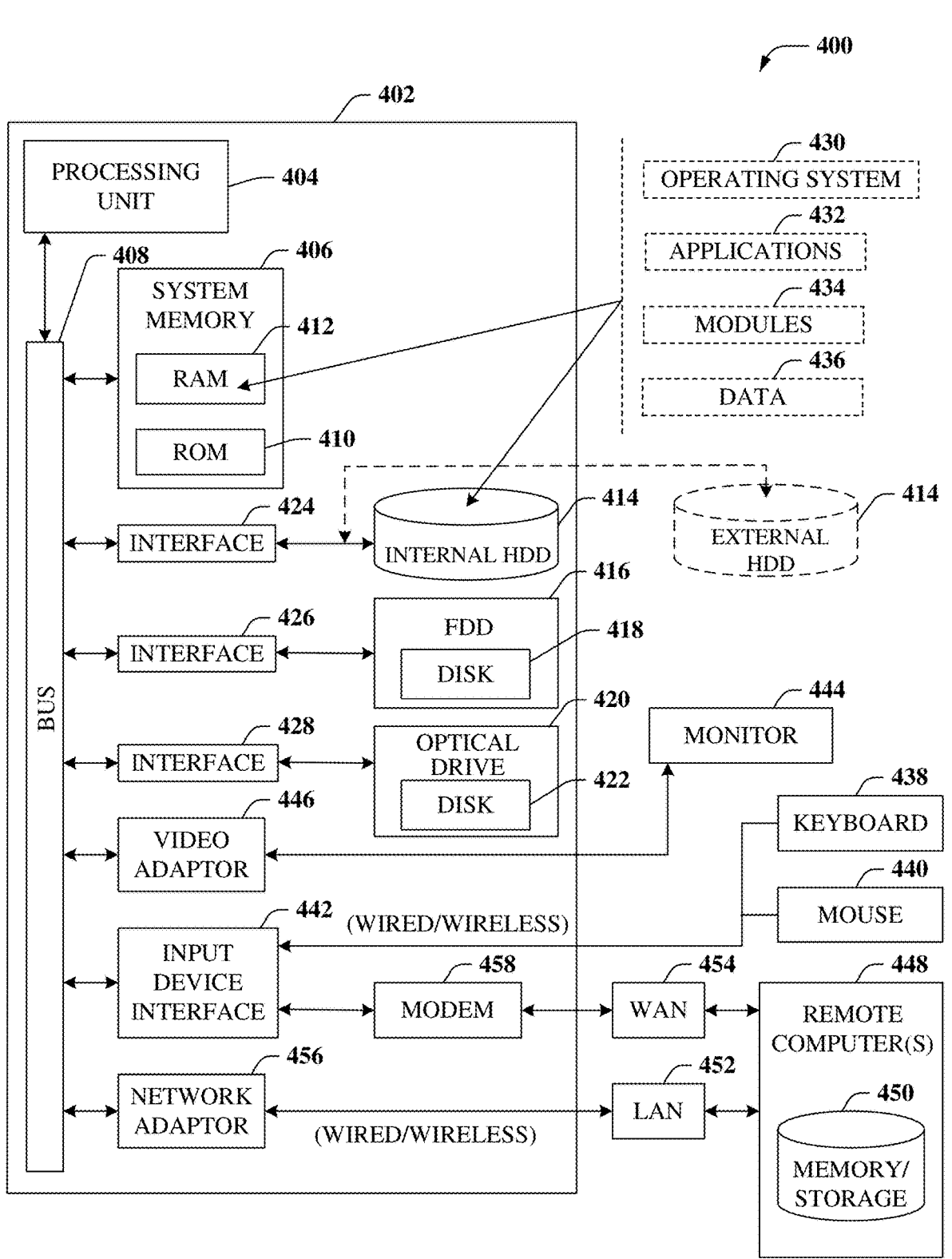
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the computing device 202, the gateway 204, the gaming server 209 or combinations thereof.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
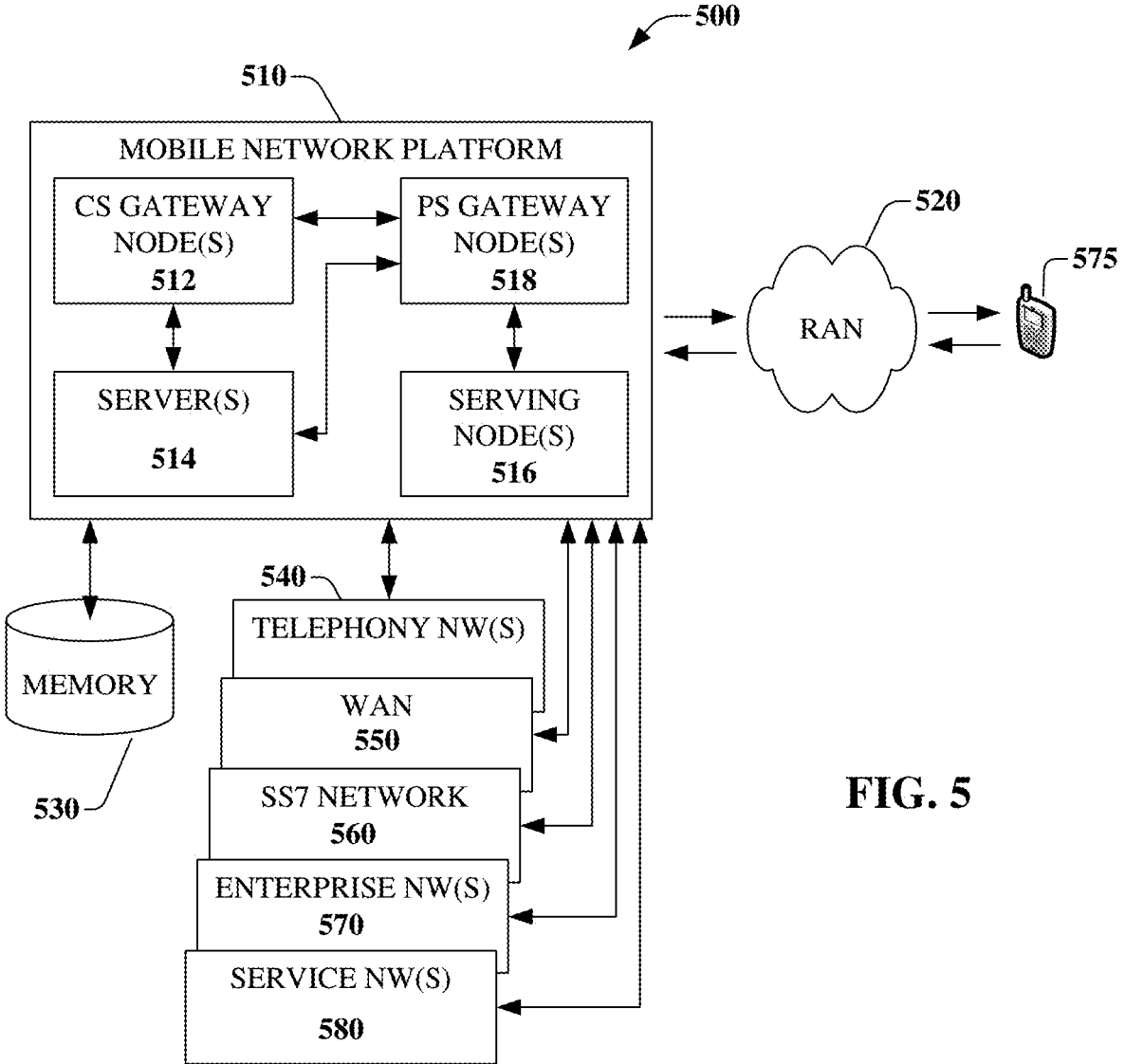
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the gateway 204 and/or the gaming server 209. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system

7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise a utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
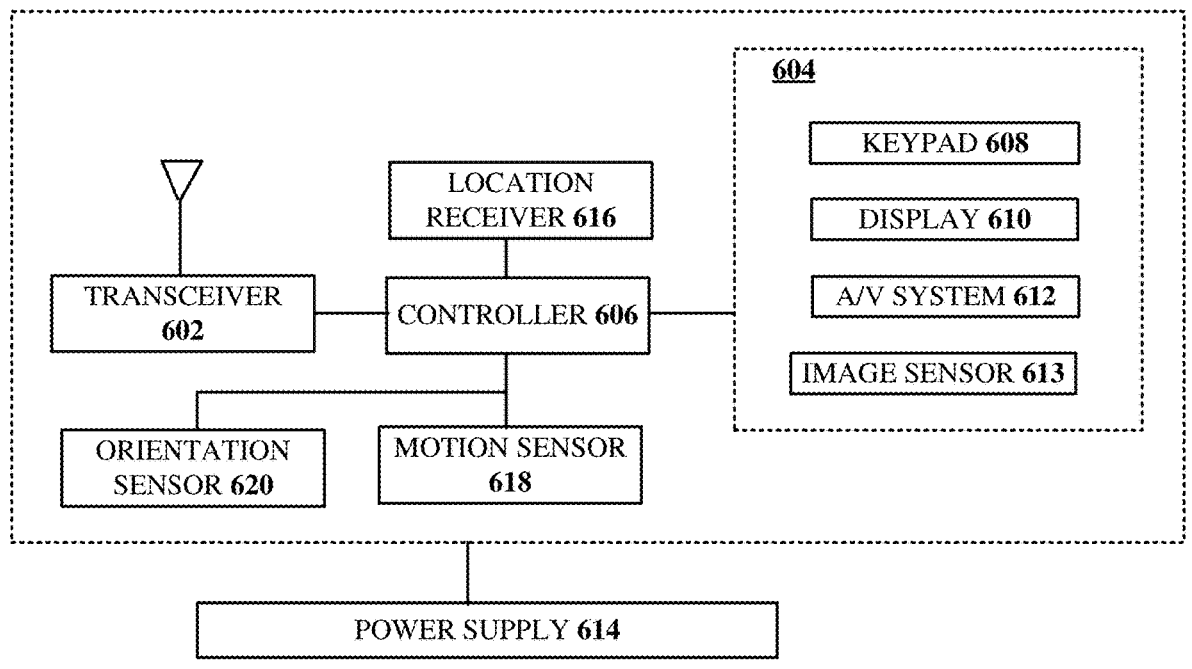
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the computing device, the gateway 204, the gaming server 209, or combinations thereof.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example"

or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A gateway, comprising:
   a processing system including a processor; and a memory that stores executable instructions that, when executed by the processing system, facilitate performance of operations, the operations comprising:

providing one or more computing devices access to internet services;

monitoring internet traffic associated with the one or more computing devices;

identifying, using a machine learning model, a first portion of packets from the internet traffic associated with a plurality of gaming activities based on a flow size, a size of packets in a flow, a combination of source internet protocol (IP), destination IP and port, a traffic rate, or a combination thereof;

identifying, with the machine learning model, a second portion of packets from the internet traffic associated with non-gaming activities based on the flow size, the size of packets in a flow, the combination of source internet protocol (IP), destination IP and port, the traffic rate, or a combination thereof;

at an ingress point of the gateway, maintaining a first memory queue and a second memory queue;

inserting the first portion of packets arriving at the ingress point into the first memory queue;

inserting the second portion of packets arriving at the ingress point into the second memory queue; and forwarding into an egress queue by prioritizing at least a segment of the first portion of packets of internet traffic inserted into the first memory queue over the second portion of packets inserted into the second memory queue to reduce latency in processing at least a portion of the plurality of gaming activities, wherein the prioritizing comprises transferring the at least the segment of the first portion of packets with a rate ratio r where for every r packets transferred from the first memory queue to the egress queue, one packet from the second memory queue is transferred to the egress queue, wherein r is a variable positive integer greater than 1.

2. The gateway of claim 1, wherein the identifying the first portion of packets of the internet traffic comprises identifying a device that is a source of the first portion of packets of the internet traffic.

3. The gateway of claim 1, wherein the identifying the first portion of packets of the internet traffic comprises identifying a destination address in the first portion of packets of the internet traffic that is associated with a gaming application.

4. The gateway of claim 1, wherein the identifying the first portion of packets of the internet traffic comprises matching the first portion of packets of the internet traffic to a traffic pattern associated with the gaming activities.

5. The gateway of claim 1, wherein the operations further comprise:

identifying, in the first portion of packets of the internet traffic, one or more gaming activities from the plurality of gaming activities that require lower latency than other gaming activities to avoid adversely affecting game performance, wherein latency is not critical for game performance of the other gaming activities.

6. The gateway of claim 5, wherein the prioritizing further comprises:

assigning the at least the segment of the first portion of packets of the internet traffic to the first memory queue;

assigning to the second memory queue to the second portion of the internet traffic;

assigning to the second memory queue a remainder of the internet traffic unassociated with the at least the segment of the first portion of packets of the internet traffic; and processing the first memory queue before the second memory queue to reduce latency of packets associated with the first memory queue.

7. The gateway of claim 5, wherein the operations further comprise training the machine learning model for detecting the internet traffic associated with gaming activities, wherein the machine learning model is implemented with a neural network, a long short-term memory network, a transformer or a combination thereof.

8. The gateway of claim 1, wherein the gateway corresponds to a residential gateway, and wherein the plurality of gaming activities correspond to metaverse gaming activities.

9. A non-transitory machine-readable medium, comprising executable instructions that, when executed by a gateway including a processor, facilitate performance of operations, the operations comprising:

providing one or more computing devices access to internet services;

monitoring internet traffic associated with the one or more computing devices;

identifying, using a machine learning model, a first portion of packets of the internet traffic associated with a plurality of gaming activities based on a flow size, a size of packets in a flow, a combination of source internet protocol (IP), destination IP and port, a traffic rate, or a combination thereof;

identifying, with the machine learning model, a second portion of packets of the internet traffic associated with non-gaming activities based on the flow size, the size of packets in a flow, the combination of source internet protocol (IP), destination IP and port, the traffic rate, or a combination thereof;

at an ingress point of the gateway, maintaining a first memory queue and a second memory queue;

inserting the first portion of packets arriving at the ingress point into the first memory queue;

inserting the second portion of packets arriving at the ingress point into the second memory queue; and forwarding into an egress queue by prioritizing at least a segment of the first portion of packets of internet traffic inserted into the first memory queue over the second portion of packets inserted into the second memory queue to reduce latency in processing at least a portion of the plurality of gaming activities, wherein the prioritizing comprises transferring the at least the segment of the first portion of packets with a rate ratio r where for every r packets transferred from the first memory queue to the egress queue, one packet from the second memory queue is transferred to the egress queue, wherein r is a variable positive integer greater than 1.

10. The non-transitory machine-readable medium of claim 9, wherein the operations further comprise receiving a plurality of gaming objects from a gaming application.

11. The non-transitory machine-readable medium of claim 9, wherein the operations further comprise:

submitting, to a gaming application, one or more requests for a plurality of gaming objects responsive to predicting a use by a first computing device of the plurality of gaming objects; and receiving the plurality of gaming objects from the gaming application.

12. The non-transitory machine-readable medium of claim 9, wherein the operations further comprise receiving a plurality of gaming objects from a gaming application responsive to the gaming application predicting a use by a first computing device of the plurality of gaming objects.

13. The non-transitory machine-readable medium of claim 12, wherein the operations further comprise receiving a request from the first computing device for at least one second gaming object from the plurality of the gaming objects based on a gaming event detected by the first computing device.

14. The non-transitory machine-readable medium of claim 9, wherein at least one first gaming object is encrypted, and wherein the operations further comprise causing a supplying of the at least one first gaming object by decrypting the at least one first gaming object with a decryption key prior to supplying the at least one first gaming object to a first computing device.

15. The non-transitory machine-readable medium of claim 14, wherein the operations further comprise receiving the decryption key at a designated time of release set by a server.

16. The non-transitory machine-readable medium of claim 14, wherein one or more gaming objects are managed by the gateway with an electronic wallet.

17. The non-transitory machine-readable medium of claim 14, wherein a synchronization process is performed according to an IEEE standard for time-stamping gaming activities generated by the first computing device and a second computing device.

18. The non-transitory machine-readable medium of claim 17, wherein the operations further comprise granting access to the at least one first gaming object with an electronic wallet.

19. A method comprising:

providing, by a processing system including a processor of a gateway, one or more computing devices access to internet services;

monitoring, by the processing system, internet traffic associated with the one or more computing devices;

identifying, by the processing system, using a machine learning model, a first portion of packets of the internet traffic associated with a plurality of gaming activities based on a flow size, a size of packets in a flow, a combination of source internet protocol (IP), destination IP and port, a traffic rate, or a combination thereof;

identifying, by the processing system, using the machine learning model, a second portion of packets of the internet traffic associated with non-gaming activities based on a flow size, a size of packets in a flow, a combination of source internet protocol (IP), destination IP and port, a traffic rate, or a combination thereof;

at an ingress point of the gateway, maintaining, by the processing system, a first memory queue and a second memory queue;

inserting, by the processing system, the first portion of packets arriving at the ingress point into the first memory queue;

inserting, by the processing system, the second portion of packets arriving at the ingress point into the second memory queue; and forwarding, by the processing system, into an egress queue by prioritizing at least a segment of the first portion of packets of internet traffic inserted into the first memory queue over the second portion of packets inserted into the second memory queue to reduce latency in processing at least a portion of the plurality of gaming activities, wherein the prioritizing comprises transferring the at least the segment of the first portion of packets with a rate ratio r where for every r packets transferred from the first memory queue to the egress queue, one packet from the second memory queue is transferred to the egress queue, wherein r is a variable positive integer greater than 1.

20. The method of claim 19, further comprising maintaining, by the processing system, three or more memory queues, each memory queue associated with a different priority policy.

\* \* \* \* \*